US00RE34488E

United States Patent [19]

Clark

[11] E Patent Number: Re. 34,488

[45] Reissued Date of Patent: Dec. 28, 1993

[54] PORTABLE DEVICE FOR STORING AN ENDLESS METALLIC OR FIBER-OPTIC CABLE

[75] Inventor: Albert L. Clark, West Bend, Wis.

[73] Assignee: Stockbridge Manufacturing, Inc., Stockbridge, Wis.

[21] Appl. No.: 676,298

[22] Filed: Mar. 27, 1991

Related U.S. Patent Documents

Reissue of:

[64] Patent No.: 4,871,127
Issued: Oct. 3, 1989
Appl. No.: 128,060
Filed: Dec. 3, 1987

[51] Int. Cl.[5] ..... B65H 75/40; H02G 1/06

[52] U.S. Cl. ..... 254/134.3 R; 242/86.5 R; 242/54 R; 242/158 R; 405/174

[58] Field of Search ..... 242/54; 254/134.3; 405/174, 180

[56] References Cited

U.S. PATENT DOCUMENTS

| | | | |
|---|---|---|---|
| 3,148,863 | 9/1964 | Peterson | 242/54 R |
| 3,202,372 | 8/1965 | Meline et al. | 242/54 R |
| 3,315,917 | 4/1967 | Brown | 242/128 |
| 3,386,682 | 6/1968 | Bajek | 242/85.1 |
| 3,915,403 | 10/1975 | King | 242/47.01 |
| 4,164,331 | 8/1979 | Henrich | 242/47 |
| 4,454,999 | 6/1984 | Woodruff | 242/86.5 R |
| 4,616,790 | 10/1986 | Beltran | 242/85.1 |
| 4,744,696 | 5/1988 | Vidler | 242/86.5 R |

FOREIGN PATENT DOCUMENTS

| | | | |
|---|---|---|---|
| 0008352 | 3/1980 | European Pat. Off. | 242/86.5 R |
| 2642462 | 4/1977 | Fed. Rep. of Germany | 242/86.5 R |
| 1071784 | 6/1967 | United Kingdom | 242/54 R |

OTHER PUBLICATIONS

"The Manitou Staticoil Rewind System", Brochure dated 1979, printed by Meridian Printing Ltd., Lloyd Minster, Alberta.

*Primary Examiner*—John M. Jillions
*Attorney, Agent, or Firm*—Andrus, Sceales, Starke & Sawall

[57] ABSTRACT

A portable trailer supports a long horizontal tube on which is mounted a rotatable and reciprocable drum and a fixed storage reel. The center tube, reel, and drum contain alignable longitudinally extending radial slots therethrough. Attached to the drum and extending over the reel is a bail and a series of snatch blocks. A slack cable is inserted transversely through the aligned slots in the drum, center tube, and reel such that it lays in the interior of the center tube. The cable is looped inside the reel and then transversely inserted into the bail and snatch blocks. Rotating and reciprocating the drum neatly winds the cable onto the storage reel from a supply reel, although there is no access to the cable ends.

47 Claims, 5 Drawing Sheets

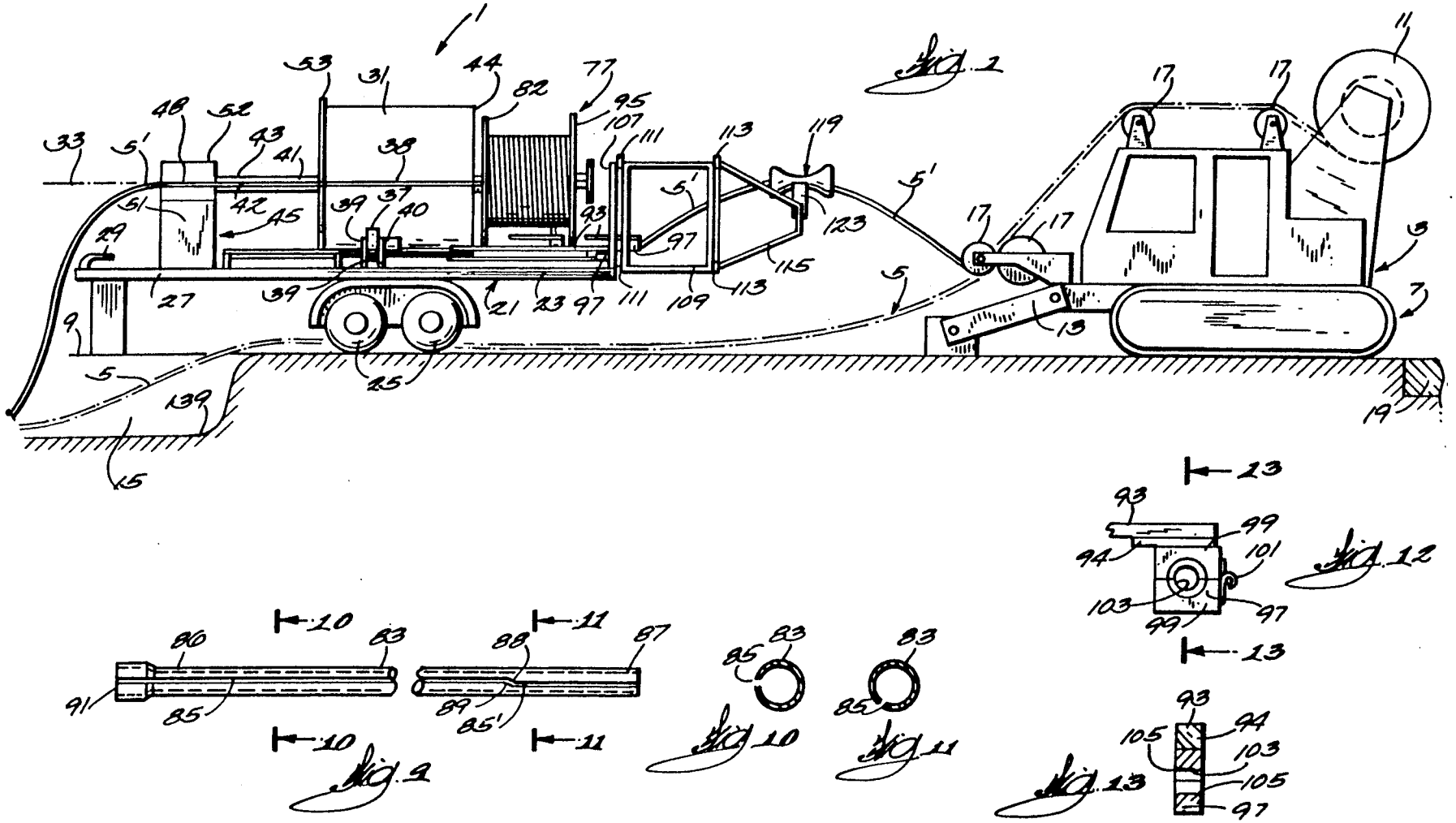

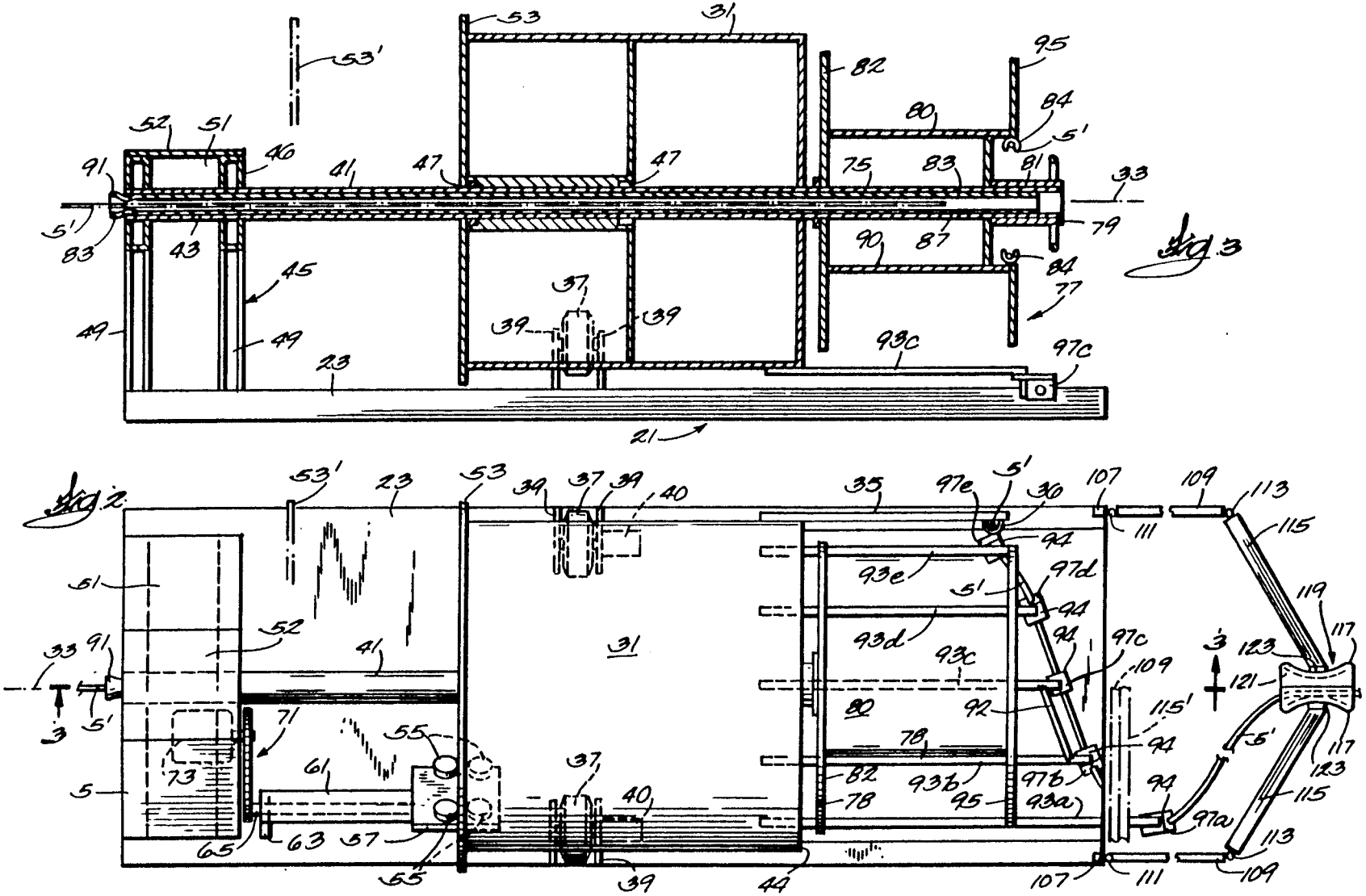

PORTABLE DEVICE FOR STORING AN ENDLESS METALLIC OR FIBER-OPTIC CABLE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to cable handling, and more particularly to apparatus for laying underground cable.

2. Description of the Prior Art

The contribution of fiber-optics to the communications age is well known. With fiber-optics, thousands of messages can be transmitted simultaneously through a single fiber.

A major problem associated with fiber-optic technology concerns the placement and protection of the fiber-optic cables. It is generally accepted practice to lay fiber-optic cables underground below the frost line. Various equipment has been developed to efficiently lay the cable across fields and other unobstructed areas. However, substantial difficulties are encountered when the fiber-optic cable must be laid under such obstructions as highways, railroads, and gas and oil pipelines. Splicing fiber-optic cables is both costly and detrimental to the strength and quality of the light signals to be pulsed through the cables.

To lay splice-free cables under various obstructions, it is known to unwind an entire supply reel of cable at the obstruction. The cable is pulled back and strung in one or more long loops stretching away from the obstruction. The cable free end is then fed through a bore under the obstruction. Finally, the cable is rewound on the supply reel located on the downstream side of the obstruction. A variation of the pull-back method is the FIG. 8 method. The cable is entirely unwound from the supply reel, but it is laid in the form of several overlapping figure-8s on the ground. Both the pull-back and figure-8 methods are very time consuming and therefore costly ways of passing cables under obstructions. Further, laying the fiber-optic cables on the ground renders them susceptible to damage by machinery and personnel in the area.

Manitou Industries of Neilburg, Saskatchewan, Canada has developed apparatus that eliminates the need for laying the cable on the ground at an obstruction. The Manitou device employs a pair of special cable reels that give access to the cable free end underlying the overlying cable of the supply reel. At an obstruction, the plow supply reel is unloaded from the plow and placed on the ground. The cable free end is pulled from the special reel and is partially unwound by an unwinding tower attached to the reel. The cable free end is passed under the obstruction. The cable free end is then wound onto a second special reel on a trailer located on the downstream side of the obstruction simultaneously with unwinding the cable from the original supply reel attached to the unwinding tower. The second reel is then unloaded from the trailer and loaded onto the plow, where it becomes the plow supply reel for supplying cable until the next obstruction is reached. At the next obstruction, the reel unloading, unwinding, rewinding, and reloading process is repeated. Although the Manitou system is an improvement over merely laying the cable on the ground, it nevertheless requires substantial time to unload and load two reels at the obstructions. Further, a substantial expenditure is required for the special reels and the machinery for handling them.

Thus, a need exists for improved apparatus and methods for laying continuous underground cables.

SUMMARY OF THE INVENTION

In accordance with the present invention, portable storage equipment is provided that efficiently handles endless metallic or fiber-optic underground cable at various obstructions in the cable path. This is accomplished by apparatus that includes a rotatable drum and bail that temporarily wind the cable onto an adjacent storage reel without requiring access to either end of the cable.

The drum and bail are mounted on a relatively small trailer that is towable by a motor vehicle, such as a pick-up truck. The drum is mounted for rotation about its longitudinal axis on the trailer. The storage reel is fixedly mounted on the trailer adjacent the drum, with the drum and reel longitudinal axes being coincident. In addition to rotating, the drum reciprocates along its longitudinal axis. The bail extends axially from the end of the drum so as to overhang the fixed reel for all axial locations of the drum relative to the reel.

The drum is formed with a radial slot extending the full length thereof. In addition, the mounting frame and bearings that rotatably support the drum on the trailer have radial slots alignable with the drum slot. A portion of the stationary reel also has a longitudinally extending radial slot, but the entire length of the reel need not be slotted. The reel slot is in angular alignment with the frame slots. A long inner tube loosely mounted inside the drum mounting frame also has a longitudinal slot for the majority of its length.

A pair of rollers mounted to the trailer contact and help support the drum periphery. A hydraulic circuit operates a pair of motors that drive the rollers for rotating the drum. A third hydraulic motor rotates a lead screw that cooperates with a drum gripping mechanism to reciprocate the drum along its longitudinal axis in timed relation to the drum rotation.

Also attached to and extending axially from the drum are a series of different length strips. A spring loaded snatch block is fixed to the free end of each strip. Openings in the snatch blocks cooperate to guide the cable in a smooth three dimensional path to the bail. To guide the cable running end to the first snatch block, the portable storage equipment of the present invention includes a double ended guide funnel. The funnel is split longitudinally into two halves, and each half is pivotally mounted to the trailer. When the funnel halves are properly located and latched together, they mate to capture the cable and create a smooth cable guide.

In operation, a cable laying tractor or plow with a supply reel of cable lays the cable underground in a normal fashion until it reaches an obstruction, such as a highway. At that point, the portable apparatus of the present invention is brought up and parked near the plow. The drum is rotated until the radial slot therein is aligned with the slots in the support frame and in the stationary reel. Some slack is produced in the cable by the plow. The cable slack is inserted transversely through the aligned slots in the support frame, drum bearings, drum, inner tube, and reel. A large loop of cable is formed inside the stationary reel and is retained in place within a longitudinally slit piece of tubing. The plow end of the cable, which remains passing through the reel slot, is wound a few turns around the reel, and then it is passed transversely through the bail, snatch blocks, and guide funnel. The hydraulic circuit of the invention is actuated to rotate and reciprocate the drum together with the bail and snatch blocks, thereby unwinding the cable from the plow supply reel and winding it into the stationary reel.

After the cable is completely unwound from the plow supply reel and wound onto the portable storage reel of the present invention, the plow is free to cross the obstruction in any convenient and safe manner. The cable free end is fed through a bore under the obstruction and then reattached to the supply reel on the plow. A reverse procedure is then performed with the drum and bail rotating and reciprocating to unwind the cable from the temporary storage reel at the same time the cable is being rewound onto the plow supply reel. The plow then resumes laying the cable in the normal fashion, and the trailer is towed to the next obstruction in the cable path.

Other objects, aims, and advantages of the invention will become apparent to those skilled in the art upon reading the disclosure.

BRIEF DESCRIPTION OF THE DRAWINGS

FIG. 1 is a side view showing the portable storage apparatus of the present invention in operation with a cable laying plow.

FIG. 2 is an enlarged top view of the portable storage apparatus of the present invention.

FIG. 3 is a cross-sectional view taken along lines 3—3 of FIG. 2.

FIG. 9 is a side view of the inner tube of the portable storage apparatus of the present invention.

FIG. 10 is a cross-sectional view taken along lines 10—10 of FIG. 9.

FIG. 11 is a cross-sectional view taken along lines 11—11 of FIG. 9.

FIG. 12 is an enlarged front view of a snatch block used on the portable storage apparatus of the present invention.

FIG. 13 is a cross-sectional view taken along lines 13—13 of FIG. 12.

DETAILED DESCRIPTION OF THE INVENTION

Figure 4:
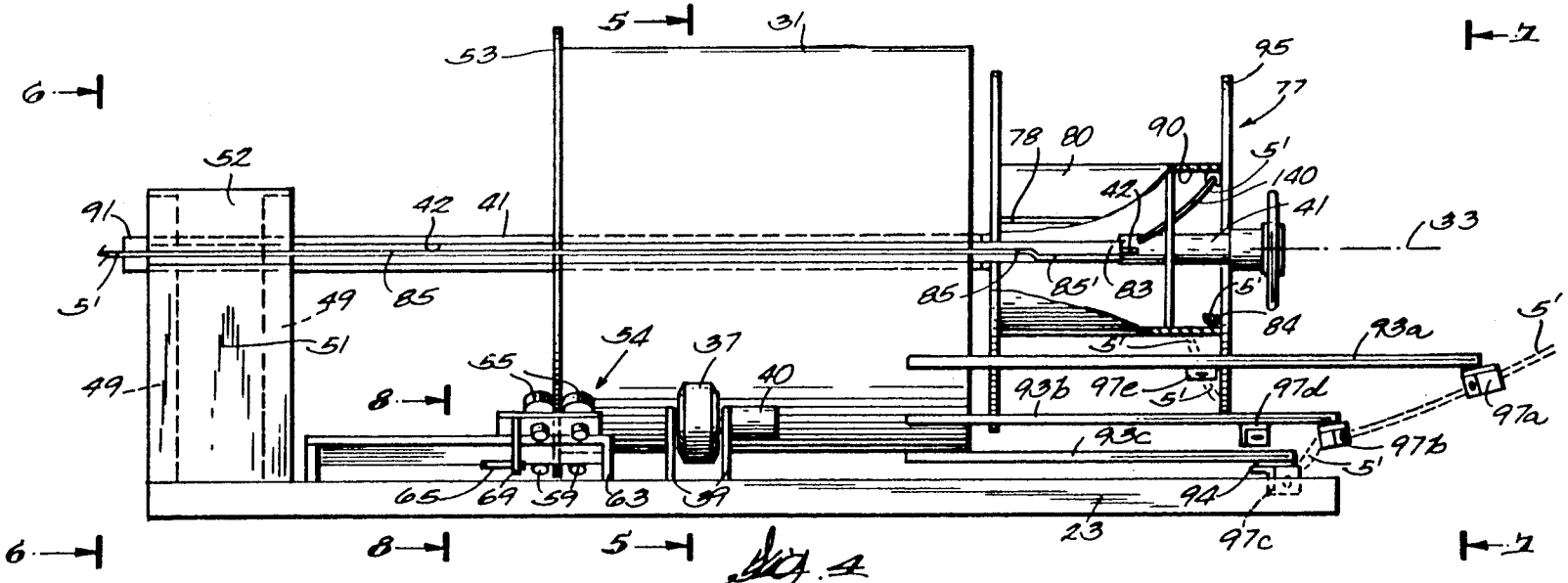
FIG. 4 is an enlarged partially broken side view of the portable storage apparatus of the present invention.
Figure 5:
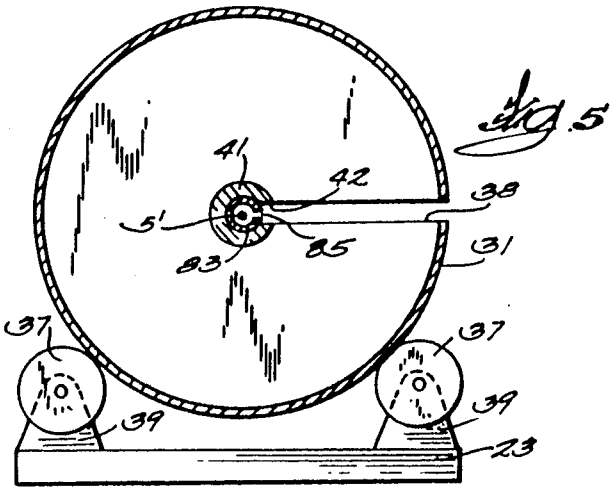
FIG. 5 is a cross-sectional view taken along lines 5—5 of FIG. 4.
Figure 6:
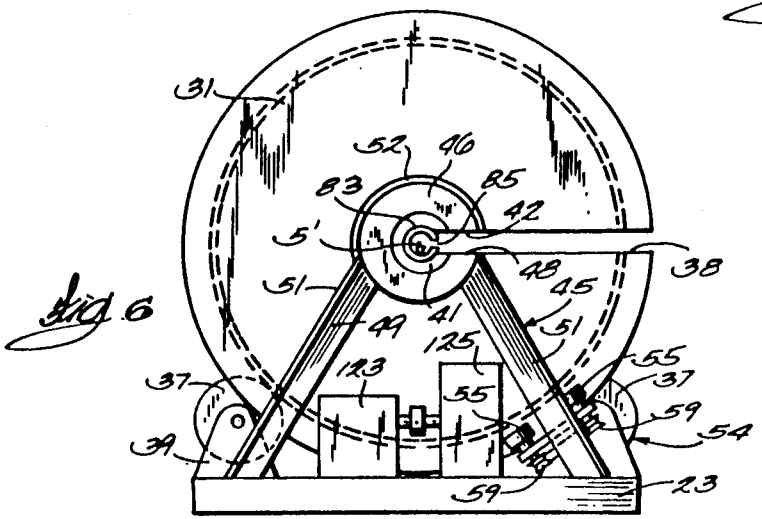
FIG. 6 is a view taken along lines 6—6 of FIG. 4.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a portable storage apparatus 1 is illustrated that includes the present invention. The storage apparatus is particularly useful for cooperating with a conventional plow 3 for laying underground flexible cable 5, but it will be understood that the invention is not limited to cable laying applications.

In the normal operation, the plow 3 comprises a tractor 7 designed for off-road use over ground surface 9. The tractor supports a supply reel 11 that holds as much as 19,000 feet of fiber-optic or other endless cable 5. The tractor is further equipped with a conventional earth trenching device, schematically represented at 13, as is known in the art. The trencher 13 opens a trench 15 in the earth and may also be designed to fill the trench. The tractor 7 includes suitable means 17 for guiding the cable in long smooth arcs from the reel 11 into the trench 15.

In accordance with the present invention, the portable storage apparatus 1 is used to assist the cable laying plow 3 to lay the cable 5 under horizontal obstructions in the path of the cable route. Typical obstructions encountered in cable laying operations include railroad tracks, highways, and natural gas and oil pipelines. In FIG. 1, an obstruction in the form of a road 19 is illustrated.

DESCRIPTION OF THE APPARATUS

The cable storage apparatus 1 comprises a trailer 21 having a flat horizontal frame 23 supported on conventional wheels and axles 25. The trailer 21 includes a tongue 27 equipped with a hitch 29 for towing the apparatus by a conventional vehicle, such as a pick-up truck, not shown.

Mounted to the trailer frame 23 is a large cylindrical drum 31. The drum 31 is mounted for rotation about its longitudinal axis 33 by mechanisms to be described presently. Referring also to FIGS. 3–7, a radial slot 38 is formed in the drum. The slot 38 extends for the entire length of the drum.

The drum 31 is partially supported by rollers 37 that are rotatably mounted on the trailer frame 23 by suitable brackets 39. The rollers 37 may be rubber tires. To rotate the rollers, orbital hydraulic motors 40 are fastened to the brackets 39, and the motor shafts are coupled to the respective rollers.

The drum 31 is further supported by a long center tube 41 that extends through the center of the drum concentric with the drum axis 3 and that projects out both drum ends. The center tube 41 is manufactured with a long slot 42 that extends from the tube front end 43 to a location beyond the drum back end 44. The tube front end 43 is mounted in a stationary manner by a support 45 firmly fixed to the trailer frame 23. In the illustrated construction, the support 45 comprises two pairs of braces 49 joined at their upper ends to housings 46. The center tube passes through and is welded to the housings 46. For additional rigidity, a pair of plates 51 are welded to the braces 49, and another plate 52 is welded to the housings 46. The drum rotates about axis 33 on the tube 41 by means of bearings 47, as is best shown in FIG. 3. The bearings 47 have radial slots aligned with the drum slot 38. The housings 46 are formed with radial slots 48, FIG. 6, that are aligned with the slot 42 in the center tube 41.

Figure 8:
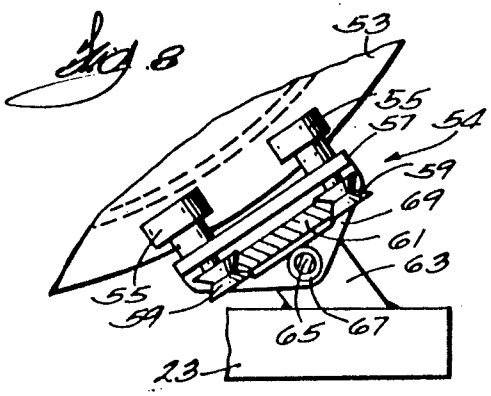
FIG. 8 is an enlarged cross-sectional view taken along lines 8—8 of FIG. 4.

In addition to rotating about its longitudinal axis 33, the drum 31 also reciprocates therealong. For that purpose, the drum front end includes a flange 53 that is captured by a gripping mechanism 54. Looking also at FIGS. 2 and 8, the gripping mechanism 54 comprises two pairs of flat rollers 55. The flange 53 is gripped between the pairs of rollers 55, which are mounted on short shafts to the top side of a plate 57. To the underside of the plate 57 are mounted two pairs of grooved rollers 59. The flat rollers 55 and plate 57 are located on a longitudinally extending guide plate 61 having tapered edge received by the grooves in the rollers 59. The ends of the guide plate 61 are supported on the trailer frame 23 by suitable brackets 63. To reciprocate the drum, a lead screw 65 mates with a nut 67 fixed to a horseshoe 69. The ends of the horseshoe 69 straddle the guide plate 61 and are bolted to the plate 57. To rotate the screw 65 and thus translate the drum, the screw is connected by suitable drive means 71 to a hydraulic motor 73. The drum reciprocates between the position shown in the solid lines of the drawings and a position wherein the drum front flange 53 is in the general location shown by the phantom lines 53'.

Mounted to the back end 75 of the center tube 41 is a stationary hollow reel 77. The reel 77 may be held in placed on the center tube by a handled nut 79 threaded onto the center tube end 75. To permit different sized reels to be mounted on the center tube, a spacer 81 may be interposed between the nut 79 and the reel. The reel is formed with a radial slot 78 that extends through the reel core 80 and the front flange 82. A slotted tube 84 is fixed circumferentially around the inner diameter of the reel core 80 at the back end thereof. The slotted tube 84 extends approximately three-fourths of the way around the inner diameter of the reel core as is best shown in FIG. 7.

Extending through generally the entire length of the center tube 41 is an inner tube 83. The inner tube 83 is loosely contained within the center tube, such that it may be freely turned within the center tube. The inner tube is preferably made from a synthetic plastic material, such as polyvinylchloride. Turning to FIGS. 9–11, the inner tube is fabricated with a slot 85 that starts at the front end 86 and extends almost the entire length of the inner tube and that passes completely through the tube wall. The slot 85 is generally parallel to the longitudinal axis for the major portion of the inner tube length. However, near the back end 87 of the inner tube, the slot 85 deviates in an angular manner for a short distance at locations 89. A short offset section of longitudinal slot 85' joins the two angular sections 89, thereby forming a lip 88 of material. The slot 85 terminates at a location 96 that is between the flanges of the reel 77 when the inner tube is inserted into the center tube. Preferably, the slot end location 96 is close to the reel front flange 82. To facilitate locating and turning the inner tube within the center tube, the inner tube front end is formed with a flared portion 91.

Figure 7:
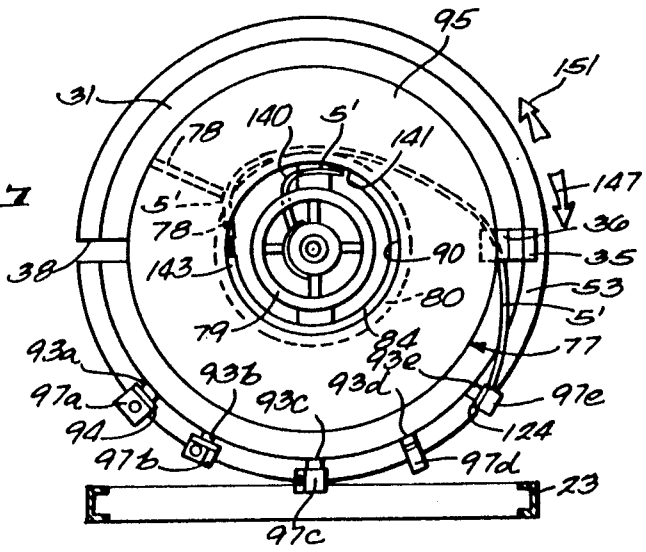
FIG. 7 is a view taken along lines 7—7 of FIG. 4.

Attached to the periphery of the drum 31 is an arm 35 that extends longitudinally over the back end 44 of the drum, as best seen in FIGS. 2 and 7. To the free end of the arm 35 is fastened a hook-like bail 36.

Also extending longitudinally from the back end 44 of the drum 31 are a series of stiff strips. Five strips 93a–93e are illustrated in FIGS. 1, 2, 4, and 7, but it will be appreciated that more or fewer strips may be employed. The strips 93 are spaced circumferentially around a portion of the drum periphery. The strips are of unequal length, with one end strip 93a being the longest, and the opposite end strip 93e being the shortest. The shortest strip 93e terminates forward of the back flange 95 of the reel 77 when the drum is in the backmost position, i.e., when the drum is in the position in the solid lines of the drawings. To increase the rigidity of the strips, their free ends may be connected together with cross strips, such as strip 92 between strips 93b and 93c in FIG. 2. For clarity, the other stiffening strips are not shown in the drawings.

Attached to the free end of each strip 93a–93e by any suitable means, such as a plate 94, is a respective snatch block 97a–97e. With particular attention to FIGS. 12 and 13, the snatch blocks 97 may be composed of two symmetrical halves 99 pivotally joined by a spring loaded hinge 101 that is biased to the closed position of the drawings. The openings 103 through the halves 99 are smoothly radiused, as at 105, at their junctions with the half faces. Preferably, the snatch blocks are made of a non-metallic material.

Turning back to FIGS. 1–7, the plates 94 are welded to the strips 93 at appropriate angles thereto, such that the snatch block openings 103 define a smooth continuous path in three dimensions. The path begins at snatch block 97a. The axis of opening 103 of the end snatch block 97a is approximately parallel to the drum axis 33. The path ends at snatch block 97e. The axis of the opening of the snatch block 97e is approximately perpendicular to the drum axis and is generally aligned with the opening in the hooked bail 36. The openings of the intermediate snatch blocks 97b–97d are arranged to provide a smooth transition between the two end snatch block openings.

In FIGS. 1 and 2, reference numerals 107 represents posts upstandingly fixed to the trailer frame 23. Additional similar posts are fixed to the frame along the two sides thereof, but for clarity they are not shown. The posts 107 are used to hold expanded metal or similar guarding material. Pivotally connected to the posts at the back end of the trailer 21 are a pair of gates 109. The pivotal connection may be by conventional hinges 111. The gates 109 have frames made of square tubing or angle iron. Expanded metal guarding spans the opening areas between the gate frames. Pivotally connected, as by hinges 113, to the free ends of the gates 109 are respective second gates 115. During transportation of the portable storage apparatus, the gates 109 and 115 are folded to a closed inoperative configuration against the back end of the trailer, as shown by the phantom lines 109' and 115'.

Mounted to the free end of each gate 115 is one half 117 of a double flared guide funnel 119. The funnel halves 117 have flared inner diameters 121. Mounting of the guide halves to the gates may be by plates 123. As best seen in FIG. 2, the two guide halves are matable to form the enclosed guide 119 when the gates 109 and 115 are in the unfolded operative configuration. A conventional latch is employed to retain the free ends of the gates 115 together and thereby hold the two guide funnel halves in place.

In the preferred embodiment, the portable storage apparatus 1 of the present invention includes a hydraulic system for rotating and reciprocating the drum 31. The hydraulic system is powered by a conventional internal combustion engine located under the support 45 and schematically represented as reference numeral 123 in FIG. 6. The engine 123 drives a conventional hydraulic pump, which forms part of a hydraulic power unit 125, as is known in the art. Suitable hydraulic lines lead from the hydraulic power unit 125 to the hydraulic motors 40 and 73.

Figure 15:
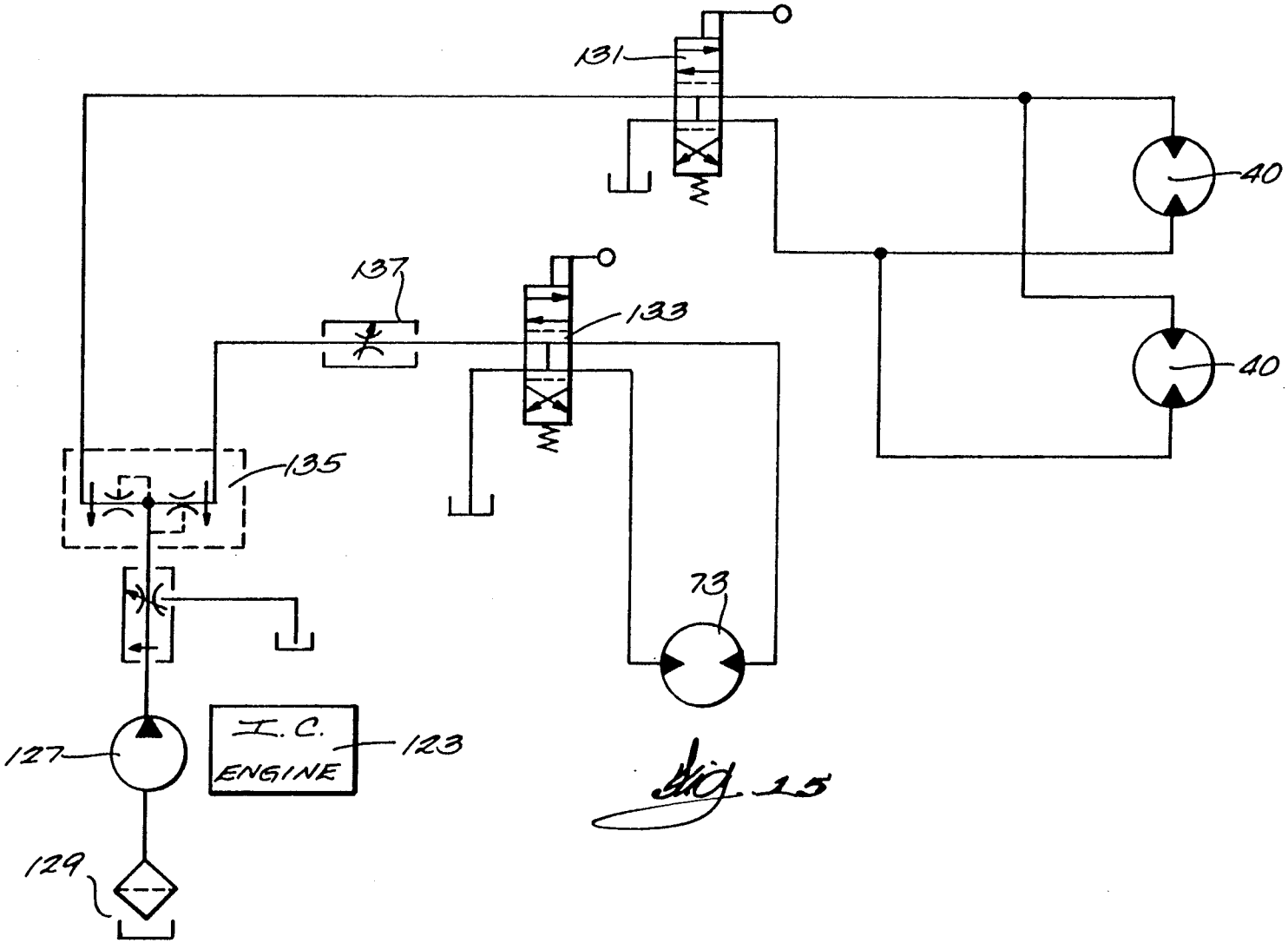
FIG. 15 is a schematic diagram of the hydraulic circuit of the present invention.

FIG. 15 shows a schematic diagram of the hydraulic circuitry associated with the portable storage apparatus 1 of the present invention. The circuitry includes a hydraulic pump 127 driven by the internal combustion engine 123 and supplied with hydraulic fluid from a reservoir 129. Hydraulic fluid under pressure is pumped to hydraulic motor 73 for reciprocating the drum 31 and to hydraulic motors 40 for rotating the drum. Directional control valves 131 and 133 are used to reverse the direction of rotation and reciprocation, respectively. Valves 135 and 137 assure proper synchronization between drum rotation and reciprocation.

OPERATION

Returning to FIG. 1, the plow 3 moves from left to right. It will be assumed that the plow has laid a length of fiber-optic or other flexible cable 5 from the supply reel 11 in the trench 15. For the normal cable laying operation, the trencher 13 is in an operative position such that it engages the earth to dig the trench, and the cable is laid on the trench bottom 139. It will further be assumed that an obstacle in the form of a road or highway 19 lies in the path of the cable. In accordance with the present invention, the plow 3 retracts the trencher 13 to an inoperative position, such as is shown in FIG. 1, when the plow is approximately 50 feet from the road. The plow continues to advance to the edge of the road, laying the cable 5 on the surface 9 of the ground. A few feet of slack are unwound from the supply reel.

The portable storage apparatus 1 of the present invention is then towed to a location near the plow 3. Preferably, the storage apparatus is parked between the plow and the end of the trench 15, with the drum axis 33 approximately parallel to the slack cable on the ground. The drum 31 is rotated under hydraulic power by the rollers 37 and motors 40 until the drum slot 38 is in angular alignment with the slots 48 in the housings 46 and with the slot 42 in the center tube 41. The inner tube 83 is manually positioned such that the slot 85 therein is aligned with the center tube and drum slots. Referring also to FIGS. 2–7 and 10, the slack cable 5 laying on the ground is then picked up, starting at the trailer front end. The cable is fed transversely through the slots 48 in the housings 46, through the slot 42 in the front end 43 of the center tube 41, and through the slot 85 in the inner tube, such that the cable is supported inside the inner tube. The cable, which has attained a position 5′ at the front end of the trailer 21, is further fed through the slot 38 in the drum 31, and through the center tube and inner tube slots in line with the drum slot, such that the cable is supported in the inner tube from the front end 86 thereof to the drum back end 44. The cable 5′ is inserted through the slot 78 in the reel front flange 82 and the core 80. The cable is further pushed through the center tube slot 42 and inner tube slot 85 underlying the reel core 80. The inner tube is rotated manually by means of the flared end 91 to enable the cable to be inserted through the angular slots 89, and the short offset slot 85′ up to the slot end 96. The lip 88 on the wall of the inner tube overlaps the center tube slot 42 and thereby prevents the cable inside the inner tube from escaping through the slots 85 and 42. With the cable inside the inner tube as far as the slot end 96, additional cable is pushed through the reel slot 78 to create a large loop 140 inside the reel inner diameter 90. The cable loop 140 is guided into the upper end 141 of the tube 84 fixed to the reel inner diameter. The cable loop passes beyond the retainer tube lower end 143. Because there is no slot in the reel back flange 95′ the cable remains positioned permanently through the slot 78 near the back flange 95. The cable may be wrapped around the reel core 80 and inserted tranversely into the bail 36. From the bail, the cable is inserted transversely into the snatch blocks 97, which are successively opened to receive the cable and then closed by means of the spring loaded hinges 101. Finally, the cable is positioned within one of the guide funnel halves 117. The gates 109 and 115 are positioned to bring the funnel halves together to form the guide funnel 119, with the cable captured therein. The gates are latched in place.

The internal combustion engine 123 of the portable storage apparatus 1 is then started to operate the hydraulic power unit 125. In a first position, the control valve 131 will cause the drum 31 to turn in the direction of arrow 147 of FIG. 7, thereby winding the cable 5′ onto the reel 77 and unwinding the cable from the plow supply reel 11. Simultaneously, control valve 133 causes the drum to reciprocate along axis 33 to create neat layers of cable on the reel 77. The smooth continuous path formed by the guide funnel 119, snatch blocks 97, and bail 36 permit winding the cable without damage. In that manner, the cable is windable onto the storage apparatus of the present invention without having access to either cable end.

Eventually, the entire cable 5 is unwound from the plow supply reel 11 and wound onto the storage reel 77. When that has occurred, the plow 3 is driven across the road 19 at any safe and convenient location. Meanwhile, the trench 15 is completed up to the road by other known equipment.

Figure 14:
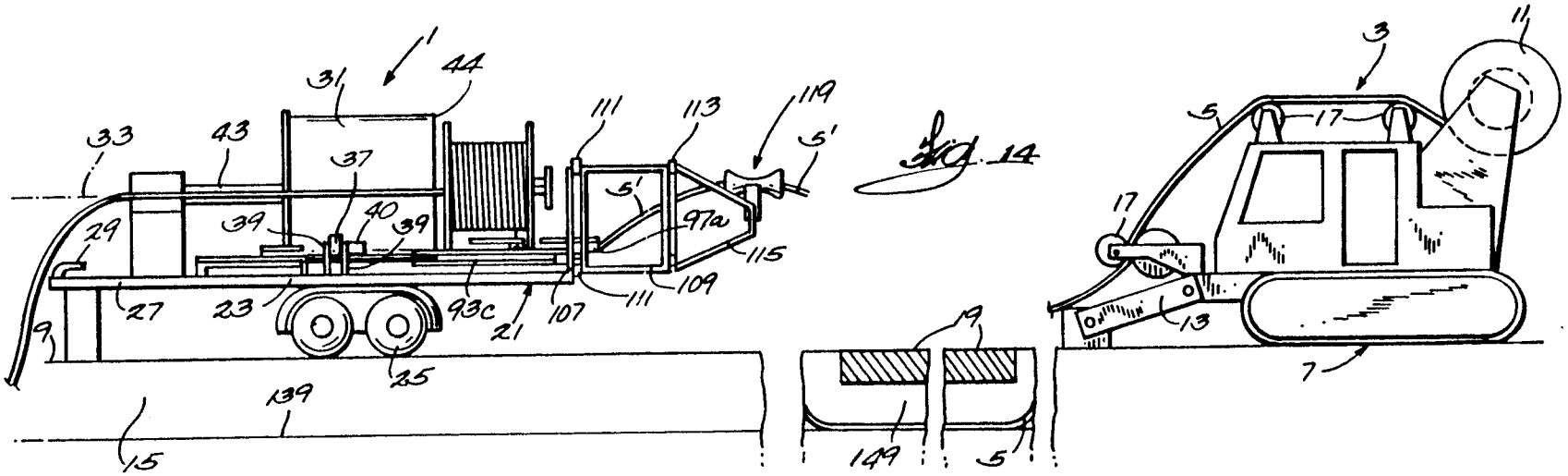
FIG. 14 is a side view of the portable storage apparatus and plow in the position for rewinding the cable onto the plow supply reel.

Turning now to FIG. 14, the plow 3 is shown in a new location across the road 19. A tunnel 149 is bored under the road. The cable free end is threaded through the bore 149 and reattached to the plow supply reel 11. The storage apparatus hydraulic circuitry is operated to rotate the drum in the direction of arrow 151 in FIG. 7, thereby unwinding the cable from the reel 77. At the same time, a suitable drive on the plow operates to wind the cable back onto the supply reel. When all the cable is unwound from the storage reel 77, the cable is pulled transversely out of the various slots 42, 38, 48, 85, 85′, 89, and 78; bail 36; snatch blocks 97; retainer tube 84; and guide funnel 119. The cable is laid within the trench 15 up to the road and then wound by the plow supply reel to take up the slack. The plow is then able to resume cable laying operations in a normal manner. The trailer 21 is towed to the next road or other obstruction in the cable path.

Thus, it is apparatus that there has been provided, in accordance with the invention, a portable device for storing an endless metallic or fiber-optic cable that fully satisfies the aims and advantage set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for temporarily storing an elongated flexible cable comprising:

a. a frame;

b. elongated support means mounted to the frame for receiving a portion of the cable therein along substantially the full length of the support means;

c. stationary reel means surrounding and permanently fixed to a first portion of the support means for receiving a portion of the cable intermediate the cable ends;

d. drum means rotatably mounted to a second portion of the support means adjacent the support means first portion and adjacent the reel means for receiving a portion of the cable therein and for winding the cable onto the reel means; and e. guide means attached to the drum means for guiding the cable onto the reel means.

2. The apparatus of claim 1 wherein the support means comprises:

a. elongated first tube means for extending completely through and supporting the drum means and the reel means; and b. brace means fixed to the frame for rigidly mounting the first tube means.

3. The apparatus of claim 2 further comprising elongated second tube means received within and extending substantially completely through the first tube means for receiving a portion of the flexible cable through substantially the full length of the second tube means.

4. The apparatus of claim 3 wherein the second tube means defines circumferentially offset lip means for cooperating with the first tube means to retain the cable within the second tube means.

5. The apparatus of claim 1 further comprising second drive means mounted to the frame for reciprocating the drum means longitudinally along the support means.

6. Apparatus for temporarily storing an elongated flexible cable comprising:

a. a frame;

b. first tube means mounted to the frame for receiving a portion of the cable therein and for supporting the drum means and the reel means;

c. brace means fixed to the frame for rigidly mounting the first tube means, wherein i. the first tube means comprises an elongated center tube having a horizontal axis and first and second ends, the center tube first end being mounted to the brace means, the center tube second end stationarily supporting the reel means, the center tube rotatably supporting the drum means between the first and second ends, the center tube being formed with a longitudinally extending radial slot therethrough; and ii. the brace means defines a longitudinally extending radial slot aligned with the center tube slot;

d. reel means fixed to the support means for receiving a portion of the cable;

e. drum means rotatably mounted to the support means adjacent the reel means for receiving a portion of the cable therein and for winding the cable unto the reel means; [and]

f. [guide means attached to the drum means for guiding the cable onto the reel means,] *wherein the drum means and the reel means are supported by the first tube means; and* g. guide means attached to the drum means for guiding the cable onto the reel means, so that the cable can be inserted transversely through the brace means and center tube slot to enter the interior of the center tube.

7. The apparatus of claim 6 further comprising an elongated inner tube loosely received within the center tube and extending generally the full length thereof, the inner tube having a longitudinally extending radial slot therethrough alignable with the slots in the center tube and the brace means, so that the cable can be passed transversely through the slots in the brace means, center tube, and inner tube to enter the interior of the inner tube.

8. The apparatus of claim 7 wherein the inner tube slot is fabricated with angular portions and an offset longitudinal portion to define a retaining lip, the lip overlapping the center tube slot when the inner tube and center tube are aligned with each other to thereby prevent the cable from escaping from the interior of the inner tube through the longitudinal slots in the center tube and inner tube.

9. The apparatus of claim 6 wherein the reel means comprises a hollow cylindrical core interposed between and joined to first and second flanges and mounted to the center tube second end, the core and first flange having a longitudinally extending radial slot therethrough aligned with the slots in the center tube and brace means, so that the cable can be passed through the reel slots into the interior of the center tube.

10. The apparatus of claim 9 further comprising retainer means fixed to the interior of the reel core for holding a loop of cable within the reel core.

11. The apparatus of claim 6 wherein the drum means comprises a cylindrical drum having a longitudinally extending radial slot therethrough alignable with the slots in the center tube and brace means, so that the cable can be inserted transversely through the drum slot and center tube slot into the interior of the center tube.

12. The apparatus of claim 11 wherein the guide means comprises:

a. an elongated arm attached to the drum and extending over the reel means;

b. a bail mounted to the arm free end and adapted to transversely receive the cable; and c. a plurality of block means connected to and located axially of the drum for cooperating with the bail to form a smooth three dimensional path for the cable as it is wound onto the reel means when the drum rotates.

13. The apparatus of claim 12 wherein the block means comprises:

a. a plurality of unequal length strips attached to and extending axially from the drum; and b. a snatch block fixed to the free end of each strip, the snatch blocks having respective openings therethrough for transversely receiving and retaining the cable, the openings being arranged such that the cable passing through the snatch blocks is guided thereby in a smooth path that continues through the bail.

14. Apparatus for temporarily storing an elongated flexible cable comprising:

a. a frame;

b. support means mounted to the frame for receiving a portion of the cable therein;

c. reel means fixed to the support means for receiving a portion of the cable;

d. drum means rotatably mounted to the support means adjacent the reel means for receiving a portion of the cable therein and for winding the cable onto the reel means;

e. guide means attached to the drum means for guiding the cable onto the reel means;

f. funnel means mounted to the frame for guiding the cable to the guide means, wherein the funnel means comprises a pair of guide funnels adapted to be separated longitudinally to transversely receive the cable and to be mated together to capture the cable inside the guide funnels; and g. gate means pivotally mounted to the frame for holding the guide funnels and for selectively separating and mating the guide funnels to thereby release or capture the cable therein.

15. In combination with a plow having a supply reel for flexible cable and adapted to lay the cable in an underground trench along a cable path, portable apparatus for temporarily storing the cable from the supply reel at selected locations along the cable path without having access to the cable ends comprising:

a. a towable trailer having a frame;

b. reel means for temporarily storing the cable intermediate the ends thereof;

c. support means for stationarily and permanently mounting the reel means to the trailer frame and for receiving a portion of the cable therein; and d. drum means mounted to the support means for selectively winding and unwinding the cable from the reel means.

16. In combination with a plow having a supply reel for flexible cable and adapted to lay the cable in an underground trench along a cable path, portable apparatus for temporarily storing the cable from the supply reel at selected locations along the cable path without having access to the cable ends comprising:

a. a towable trailer having a frame;

b. reel means for temporarily storing the cable;

c. support means for stationarily mounting the reel means to the trailer frame and for receiving a portion of the cable therein, wherein the support means comprises:

i. a horizontally extending first tube having first and second ends, the first tube defining a longitudinally extending radial slot therethrough; and ii. brace means for fixedly supporting the first tube first end to the trailer frame, the brace means defining a slot aligned with the first tube slot for permitting the cable to pass transversely through the brace means and first tube means into the interior of the tube; and d. drum means mounted to the support means for selectively winding and unwinding the cable from the reel means.

17. The combination of claim 16 further comprising a second tube loosely received within the first tube, the second tube having a longitudinally extending radial slot therethrough alignable with the slots in the brace means and first tube to thereby enable a portion of the cable to be passed transversely through the brace means and center tube and into the interior of the second tube.

18. The combination of claim 17 wherein the second tube slot defines lip means for cooperating with the first tube to retain the cable within the interior of the second tube.

19. The combination of claim 16 wherein the reel means comprises:

a. a hollow cylindrical core fixed to the first tube second end, the core defining a longitudinally extending radial slot therethrough; and b. retainer means fastened to the interior of the hollow core for removably receiving a portion of the cable.

20. The combination of claim 16 wherein the drum means comprises:

a. a cylindrical drum rotatably mounted to the first tube between the first and second ends thereof, the drum having a longitudinally extending radial therethrough that is alignable with the first tube slot for passing the cable transversely through the drum to the interior of the first tube;

b. first drive means for rotating the drum about the first tube;

c. second drive means for reciprocating the drum along the first tube; and d. guide means attached to the drum for smoothly guiding the cable from the supply reel onto the reel means as the drum rotates and reciprocates.

21. The combination of claim 20 wherein the second drive means comprises:

a. a flange on the drum;

b. roller means for gripping the drum flange;

c. actuator means mounted to the trailer frame for reciprocating the roller means; and d. plate means mounted to the trailer frame for guiding the roller means during reciprocation thereof.

22. The combination of claim 20 wherein the guide means comprises:

a. bail means attached to the drum for removeably receiving the cable and for laying the cable onto the reel means; and b. block means attached to the drum for guiding the cable in a smooth three dimensional path from the supply reel to the bail means.

23. The combination of claim 22 wherein the block means comprises:

a. a plurality of strips extending axially from the drum; and b. a snatch block mounted to the free end of each strip, the snatch blocks having respective openings therethrough that are arranged to form a smooth path for the cable between the supply reel and the bail means.

24. In combination with a plow having a supply reel for flexible cable and adapted to lay the cable in an underground trench along a cable path, portable apparatus for temporarily storing the cable from the supply reel at selected locations along the cable path without having access to the cable ends comprising:

a. a towable trailer having a frame;

b. reel means for temporarily storing the cable;

c. support means for stationarily mounting the reel means to the trailer frame and for receiving a portion of the cable therein; and d. drum means mounted to the support means for selectively winding and unwinding the cable from the reel means, wherein the drum means comprises;

i. a cylindrical drum mounted for rotation on the support means adjacent the reel means;

ii. first drive means for rotating the drum;

iii. second drive means for reciprocating the drum along the support means; and iv. guide means attached to the drum and overhanging the reel means for smoothly guiding the cable from the supply reel onto the reel means as the drum rotates.

25. In combination with a plow having a supply reel for flexible cable and adapted to lay the cable in an underground trench along a cable path, portable apparatus for temporarily storing the cable from the supply reel at selected locations along the cable path without having access to the cable ends comprising:

a. a towable trailer having a frame;
b. reel means for temporarily storing the cable;
c. support means for stationarily mounting the reel means to the trailer frame and for receiving a portion of the cable therein;
d. drum means mounted to the support means for selectively winding and unwinding the cable from the reel means; and
e. funnel means mounted to the trailer frame for guiding the cable intermediate the supply reel and the drum means, wherein the funnel means comprises a pair of funnel guides pivotally mounted to the trailer frame, the funnel guides being pivotable between a first separated configuration for permitting the cable to be placed transversely within one of the funnel guides and a second closed configuration wherein the funnel guides mate to capture the cable therein.

26. A method of storing a length of flexible cable having a standing end and a running end connected to a cable supply without having access to the cable ends comprising the steps of:

a. providing a hollow storage reel having a longitudinally extending radial slot therethrough;
b. providing a hollow drum adjacent and concentric with the storage reel, the drum having a longitudinally extending radial slot therethrough alignable with the reel slot;
c. inserting the cable intermediate the ends thereof transversely through the slots in the drum and reel and into the interior of the drum and reel along their common axis;
d. looping and retaining the cable running end inside the hollow reel;
e. guiding the cable running end on the drum between the reel and the cable supply; and
f. rotating the drum to wind the cable onto the reel from the supply.

27. The method of claim 26 comprising the further step of providing a center tube concentric with and fixedly supporting the reel and rotationally supporting the drum, the center tube having a longitudinally extending radial slot therethrough aligned with the slot in the reel.

28. The method of claim 27 comprising the further steps of:

a. providing an inner tube loosely fitting within the center tube, the inner tube having a longitudinally extending radial slot therethrough alignable with the center tube slot, the inner tube slot defining a lip;
b. positioning the inner tube slot in alignment with the center tube, reel and drum slots;
c. inserting the cable transversely through the inner tube slot to thereby locate the cable in the interior of the inner tube; and
d. rotating the inner tube to overlap the center tube slot with the inner tube lip to thereby retain the cable in the interior of the inner tube.

29. The method of claim 26 comprising the further step of reciprocating the drum simultaneously with the rotation thereof to thereby neatly wind the cable onto the reel.

30. The method of claim 26 wherein the step of guiding the cable running end between the reel and the supply comprises the step of providing a plurality of blocks joined to the drum and forming a smooth three dimensional path for the cable between the reel and cable supply.

31. A method of temporarily storing a length of flexible cable having a fixed end and a free end wound onto a supply reel comprising the steps of:

a. providing a portable trailer having a frame;
b. providing a hollow storage reel fixedly mounted to the frame and having a longitudinally extending radial slot;
c. providing a hollow drum rotatably mounted to the frame concentric with the storage reel and having a longitudinally extending radial slot;
d. positioning the trailer adjacent the cable between the fixed end thereof and the supply reel;
e. creating slack in the cable adjacent the trailer;
f. passing the cable slack transversely through the drum and storage reel slots so as to be generally coincident with the drum and storage reel axis;
g. creating and retaining a loop of cable in the storage reel interior;
h. guiding the cable on the drum between the storage and the supply reel; and
i. rotating the drum in a first direction to wind the cable from the supply onto the storage reel, so that the cable can be unwound from the supply reel and wound onto the storage reel without having access to the cable free end.

32. The method of claim 31 wherein:

a. the step of providing a storage reel comprises the step of providing an elongated center tube fixed to the frame and supporting the storage reel, the center tube having a longitudinally extending radial slot therethrough aligned with the storage reel slot; and
b. the step of passing the cable slack through the drum and storage reel slots includes the steps of passing the cable slack through the slot in the center tube to thereby position the cable in the center tube interior.

33. The method of claim 32 wherein:

a. the step of providing an elongated center tube includes the step of providing an elongated inner tube located within the center tube, the inner tube having a longitudinally extending radial slot that defines a lip; and
b. the step of passing the cable through the slot in the center tube includes the steps of passing the cable transversely through the slot in the inner tube into the interior of the inner tube, and rotating the inner tube to overlap the center tube slot with the inner tube lip.

34. The method of claim 31 wherein the step of rotating the drum comprises the step of reciprocating the drum in timed relation to the drum rotation.

35. The method of claim 31 wherein the step of guiding the cable on the drum between the supply reel and the storage reel comprises the steps of:

a. providing a plurality of spaced guide blocks attached to the drum and having respective openings therethrough that define a smooth three dimensional path for a predetermined distance between the storage and supply reels;

b. providing a bail attached to the drum and having an opening that is in a continuation of the path formed by the guide block openings; and c. passing the cable transversely through the bail and guide blocks for retention therein.

36. The method of claim 35 comprising the further steps of:

a. providing a pair of funnel guides between the guide blocks and the supply reel;

b. separating the funnel guides;

c. transversely inserting the cable into one of the funnel guides; and d. mating the funnel guides together to capture the cable for guiding it between the guide blocks and the supply reel.

37. The method of claim 31 comprising the further steps of:

a. passing the free end of the cable through an obstruction;

b. reattaching the cable free end to the supply reel;

c. winding the cable onto the supply reel and simultaneously rotating the drum in a second direction to unwind the cable from the storage reel; and d. transversely pulling the cable from the drum and storage reel slots.

38. A method of winding an endless cable without having access to the ends thereof comprising the steps of:

a. providing a stationary reel having a longitudinal axis with a central passage therealong;

b. positioning the cable intermediate the ends thereof along the reel longitudinal axis and within the reel central passage;

c. retaining the cable intermediate the ends thereof at one end of the reel, the cable portion at the other end of the reel being free of movement.

d. bending the movable cable portion smoothly from along the reel longitudinal axis into a path portion that is generally perpendicular to the reel longitudinal axis;

e. transversely retaining the movable cable portion and the path portion perpendicular to the reel longitudinal axis at a predetermined point radially of the reel longitudinal axis; and f. revolving the predetermined point about the reel longitudinal axis to thereby wind the movable cable portion onto the reel.

39. The method of claim 38 wherein the step of revolving the predetermined point comprises the steps of:

a. providing a drum rotatable about the reel longitudinal axis and reciprocable therealong;

b. providing a bail attached to the drum and overhanging the reel; and c. rotating and reciprocating the drum to thereby revolve the bail about the reel and wind the movable cable portion onto the reel.

40. A method of winding an endless cable without having access to the ends thereof comprising the steps of:

a. providing a center tube having a longitudinally extending radial slot therethrough;

b. stationarily mounting a hollow reel having a longitudinally extending radial slot therethrough over the center tube;

c. mounting a cable restraint within the interior of the hollow reel;

d. positioning the cable intermediate the ends thereof along the reel longitudinal axis;

e. retaining the cable at one end of the reel, the cable portion at the other end of the reel being free for movement;

f. bending the movable cable portion smoothly from along the reel longitudinal axis into a path portion that is generally perpendicular to the reel longitudinal axis;

g. transversely retaining the movable cable portion and the path portion perpendicular to the reel longitudinal axis at a predetermined point radially of the reel longitudinal axis; and h. revolving the predetermined point about the reel longitudinal axis to thereby wind the movable cable portion onto the reel.

41. The method of claim 40 wherein the step of positioning the cable along the reel longitudinal axis comprises the step of transversely inserting the cable through the slots in the reel and center tube to position the cable within the center tube.

42. The method of claim 40 wherein the step of bending the movable cable portion comprises the step of forming a loop of cable intermediate the cable portion along the reel longitudinal axis and the cable portion perpendicular to the reel longitudinal axis and retaining the loop in the reel cable retainer.

[43. A method of winding an endless cable without having access to the ends thereof comprising the steps of:

a. providing a reel having a longitudinal axis;

b. positioning the cable intermediate the ends thereof along the reel longitudinal axis;

c. retaining the cable at one end of the reel, the cable portion at the other end of the reel being free form movement;

d. bending the movable cable portion smoothly from along the reel longitudinal axis into a path portion that is generally perpendicular to the reel longitudinal axis;

e. transversely retaining the movable cable portion and the path portion perpendicular to the reel longitudinal axis at a predetermined point radially of the reel longitudinal axis, wherein the step of transversely retaining the movable cable portion radially of the reel longitudinal axis comprises the steps of:

i. providing a bail located radially of the reel longitudinal axis; and ii. transversely inserting the movable cable portion into the bail; and revolving the predetermined point about the reel longitudinal axis to thereby wind the movable cable portion onto the reel.]

*44. Apparatus for temporarily storing an elongated flexible cable without access to either end of the cable, comprising:*

*a reel extending along a longitudinal axis, comprising a substantially cylindrical body and a flange adjacent an end of the cylindrical body;*

*means for maintaining a portion of the cable in a predetermined position adjacent a surface of the reel body without access to either end of the cable, comprising a transverse slot formed in the flange extending inwardly from the outer edge of the flange, and wherein the slot is adapted to receive therewithin a portion of the cable intermediate its ends for maintaining the*

*cable in position adjacent the outer surface of the cylindrical body;*

*a winding mechanism for receiving the cable adjacent the portion of the cable maintained in position adjacent the reel body and for selectively winding the cable onto and unwinding the cable from the reel body; and*

*a reciprocating mechanism for providing relative back and forth movement between the winding mechanism and the reel in a direction parallel to the reel longitudinal axis for moving the cable back and forth on the reel body as it is being wound thereon by the winding mechanism.*

*45. A method of temporarily storing an elongated flexible cable without access to either end of the cable, comprising the steps of:*

*providing a reel having a core and extending along a longitudinal axis;*

*maintaining a portion of the cable in a predetermined position adjacent a surface of the reel core without access to either end of the cable by providing a flange extending outwardly from the surface of the reel core, forming a transverse inwardly extending slot in the flange commencing at the outer edge of the flange, transversely inserting the cable into the slot, and maintaining the cable in position relative to the slot inwardly of the outer edge of the flange;*

*providing a winding mechanism for winding the cable onto the reel core commencing with the portion of the cable maintained in a predetermined position adjacent a surface of the reel core; and*

*providing a reciprocating mechanism interconnected with the winding mechanism for providing back and forth movement of the cable in a direction parallel to the reel longitudinal axis as the cable is being wound onto the reel core.*

*46. A method of placing a flexible cable beneath a surface obstruction, comprising the steps of:*

*laying the cable in a trench to a point adjacent the surface obstruction;*

*placing the unlaid cable onto a reel by maintaining a portion of the cable in a predetermined position adjacent a surface of the reel without access to either end of the cable, and winding the cable onto the reel commencing with the portion of the cable maintained in a predetermined position adjacent the reel to gain access to an end of the cable;*

*feeding the end of the cable below the surface obstruction; and*

*unwinding the cable from the reel by pulling the cable from the end of the cable fed below the surface obstruction.*

*47. A method of placing a flexible cable beneath a surface obstruction, comprising the steps of:*

*laying the cable in a trench to a point adjacent the surface obstruction;*

*placing the unlaid cable onto a reel by maintaining a portion of the cable in a predetermined position adjacent a surface of the reel without access to either end of the cable, and winding the cable onto the reel commencing with the portion of the cable maintained in a predetermined position adjacent the reel, to gain access to an end of the cable;*

*feeding the end of the cable below the surface obstruction; and*

*unwinding the cable from the reel.*

* * * * *

UNITED STATES PATENT AND TRADEMARK OFFICE

CERTIFICATE OF CORRECTION

PATENT NO. : RE 34,488

DATED : December 28, 1993

INVENTOR(S) : Albert L. Clark

It is certified that error appears in the above-indentified patent and that said Letters Patent is hereby corrected as shown below:

Claim 8, Col. 10, line 14, after "tube" insert --slots--.

Claim 20, Column 12, line 11, after "radial" insert --slot--.

Claim 38, Column 15, line 38, delete "of" and insert --for--.

Signed and Sealed this

Fourth Day of October, 1994

Bruce Lehman

*Attest:*

BRUCE LEHMAN

*Attesting Officer*

*Commissioner of Patents and Trademarks*